F. R. SUNDERMAN.
ROTARY INTERNAL COMBUSTION ENGINE.
APPLICATION FILED JAN. 26, 1916.

1,285,835.

Patented Nov. 26, 1918.
5 SHEETS—SHEET 1.

INVENTOR
Frederick R. Sunderman
BY
Kenyon & Kenyon
his ATTORNEYS

F. R. SUNDERMAN.
ROTARY INTERNAL COMBUSTION ENGINE.
APPLICATION FILED JAN. 26, 1916.

1,285,835.

Patented Nov. 26, 1918.
5 SHEETS—SHEET 3.

INVENTOR
Frederick R. Sunderman,
BY
Kenyon & Kenyon,
his ATTORNEYS

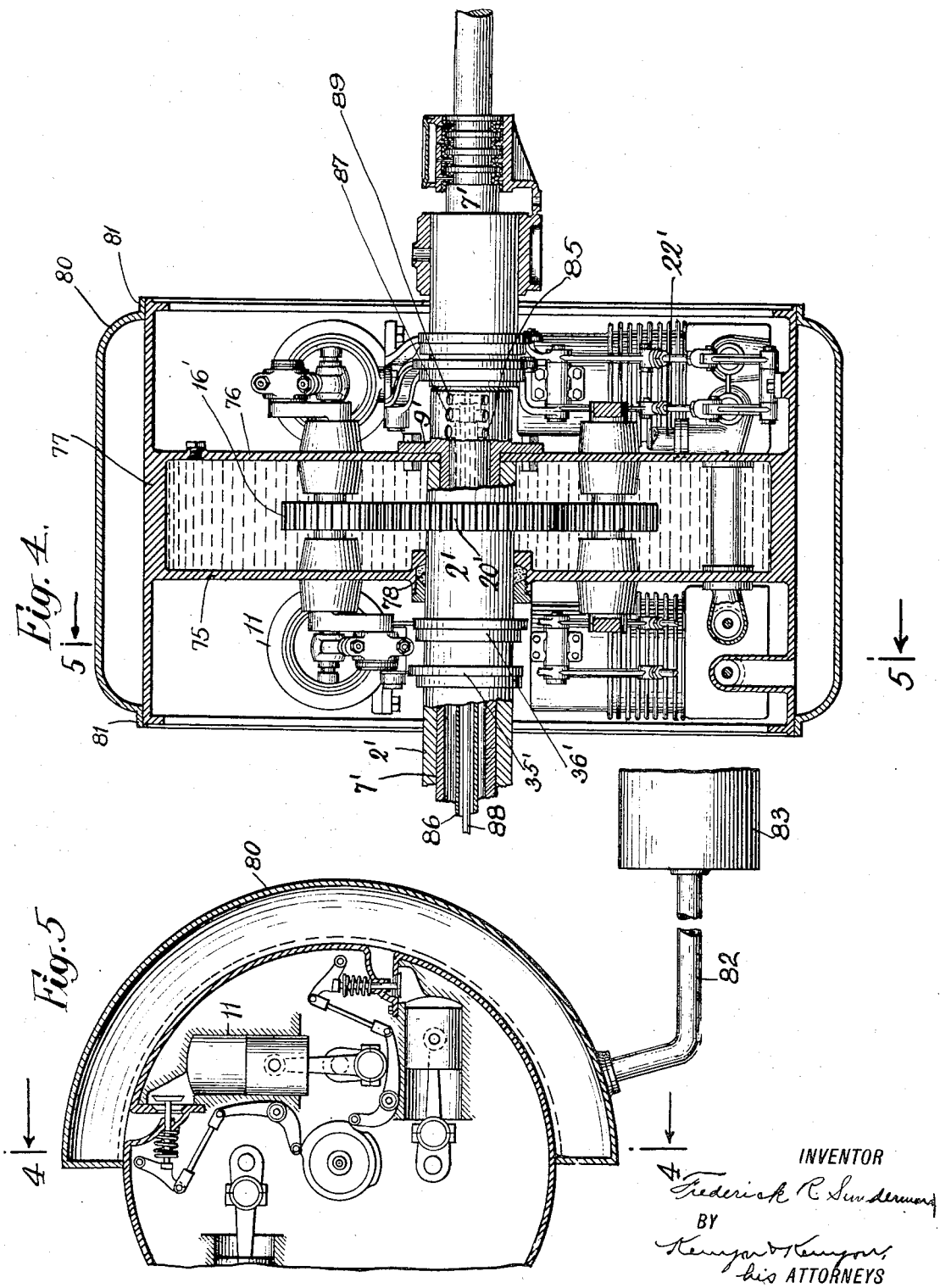

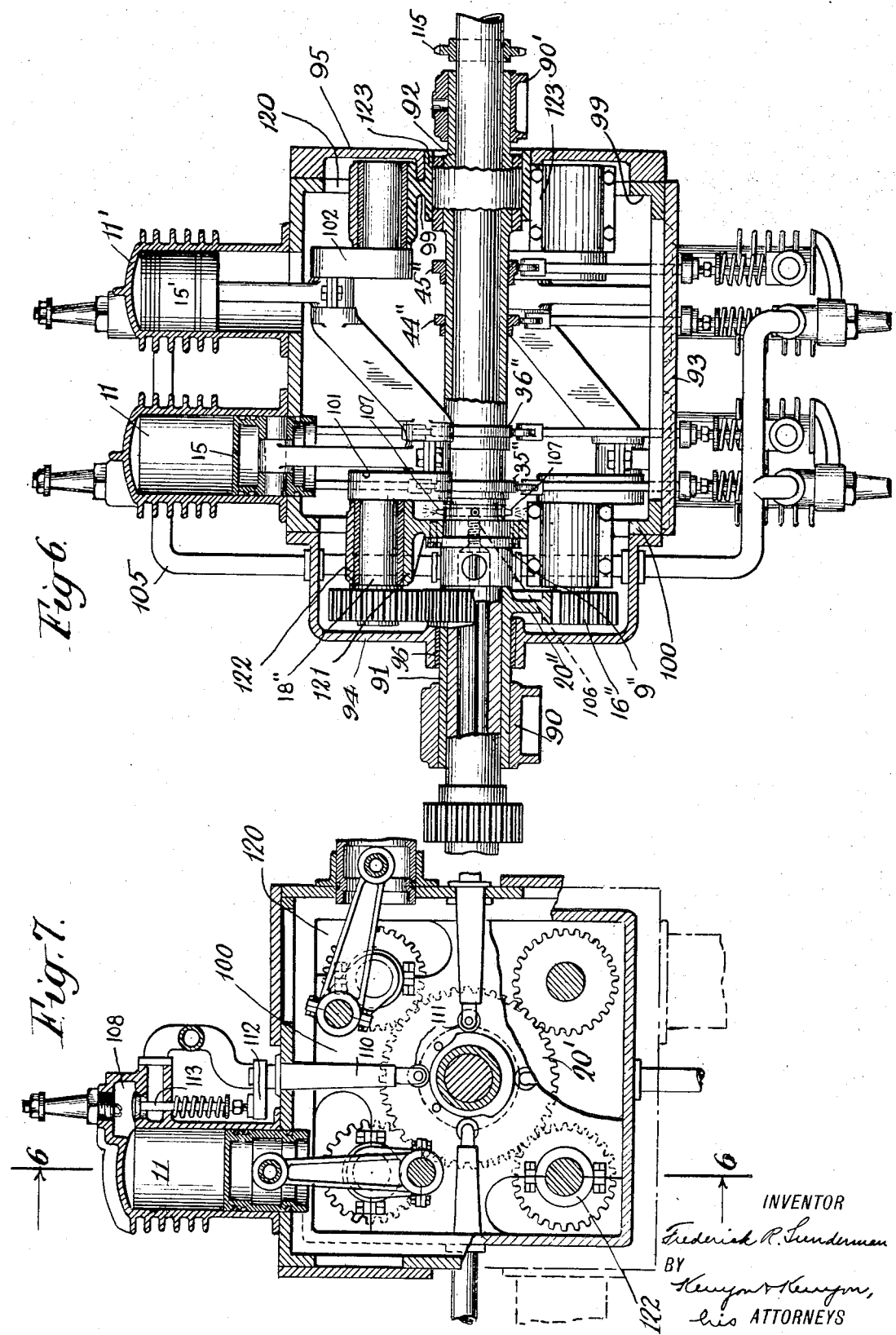

UNITED STATES PATENT OFFICE.

FREDERICK R. SUNDERMAN, OF NEWBURGH, NEW YORK, ASSIGNOR, BY DIRECT AND MESNE ASSIGNMENTS, TO SUNDERMAN CORPORATION, OF NEWBURGH, NEW YORK, A CORPORATION OF NEW YORK.

ROTARY INTERNAL-COMBUSTION ENGINE.

1,285,835.          Specification of Letters Patent.     Patented Nov. 26, 1918.

Application filed January 26, 1916. Serial No. 74,305.

*To all whom it may concern:*

Be it known that I, FREDERICK R. SUNDERMAN, a citizen of the United States, and a resident of Newburgh, in the county of Orange and State of New York, have invented certain new and useful Improvements in Rotary Internal-Combustion Engines, of which the following is a specification.

This invention relates to rotary internal combustion engines, and more particularly to that type of engine having cylinders and driving pistons rotatable with the engine about a central axis.

One of the objects of the invention is to provide a durable and efficient engine of the above type.

Other objects of the invention are to provide an engine of great power for given weight, to provide an engine well balanced about its axis of rotation, first, as regards weight, and, secondly, as regards operation, to provide a four-cycle engine having four or more spaced cylinders arranged concentrically on a frame rotatable about an axis, with means for causing each cylinder to fire at least once during each rotation of the frame, and to produce a four-cycle engine having a plurality of pairs of cylinders and pistons, the pairs being spaced concentrically on a rotatable frame about an axis of rotation, with means for firing only one of a pair at any instant, and for firing each cylinder at least once in every revolution of the frame.

Further objects and advantages of the invention will more fully appear from the following description taken in connection with the accompanying drawings illustrating the preferred form thereof.

The invention consists in the novel arrangement, construction and combination of parts which are herein described in their preferred form and arrangement, and the invention is more particularly pointed out in the appended claims.

Referring to the drawings,

Fig. 4 is a sectional elevation of a modification, taken on line 4—4 of Fig. 5;

Fig. 5 is a partial cross-sectional view of the same taken on line 5—5 of Fig. 4;

Fig. 6 is a sectional elevation of a further modification, taken on line 6—6 of Fig. 7; and Fig. 7 is a cross-sectional view taken on line 7—7 of Fig. 6.

Figure 1:
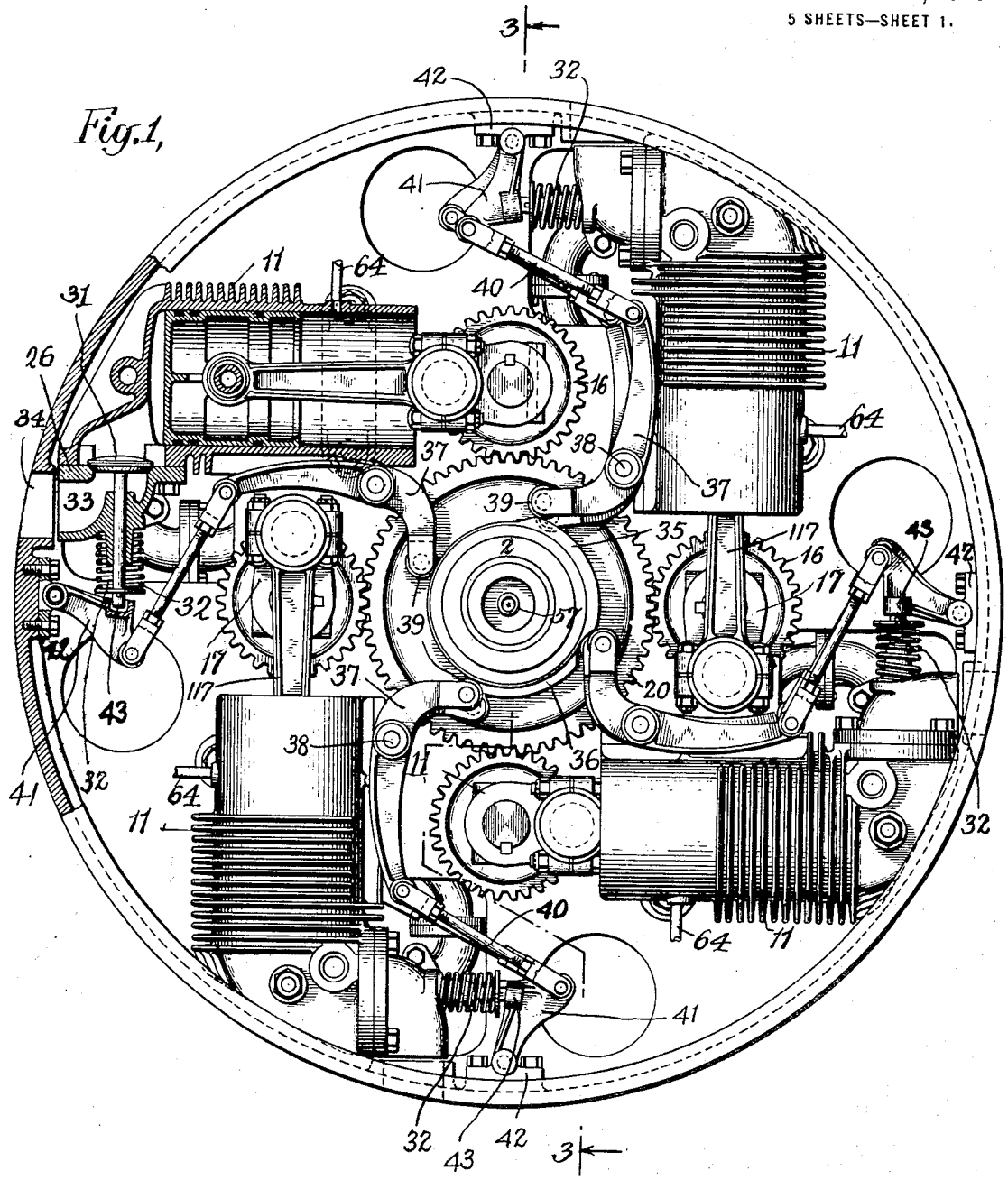
Figure 1 is an end elevation of an engine embodying one form of my invention, with certain parts in section.
Figure 3:
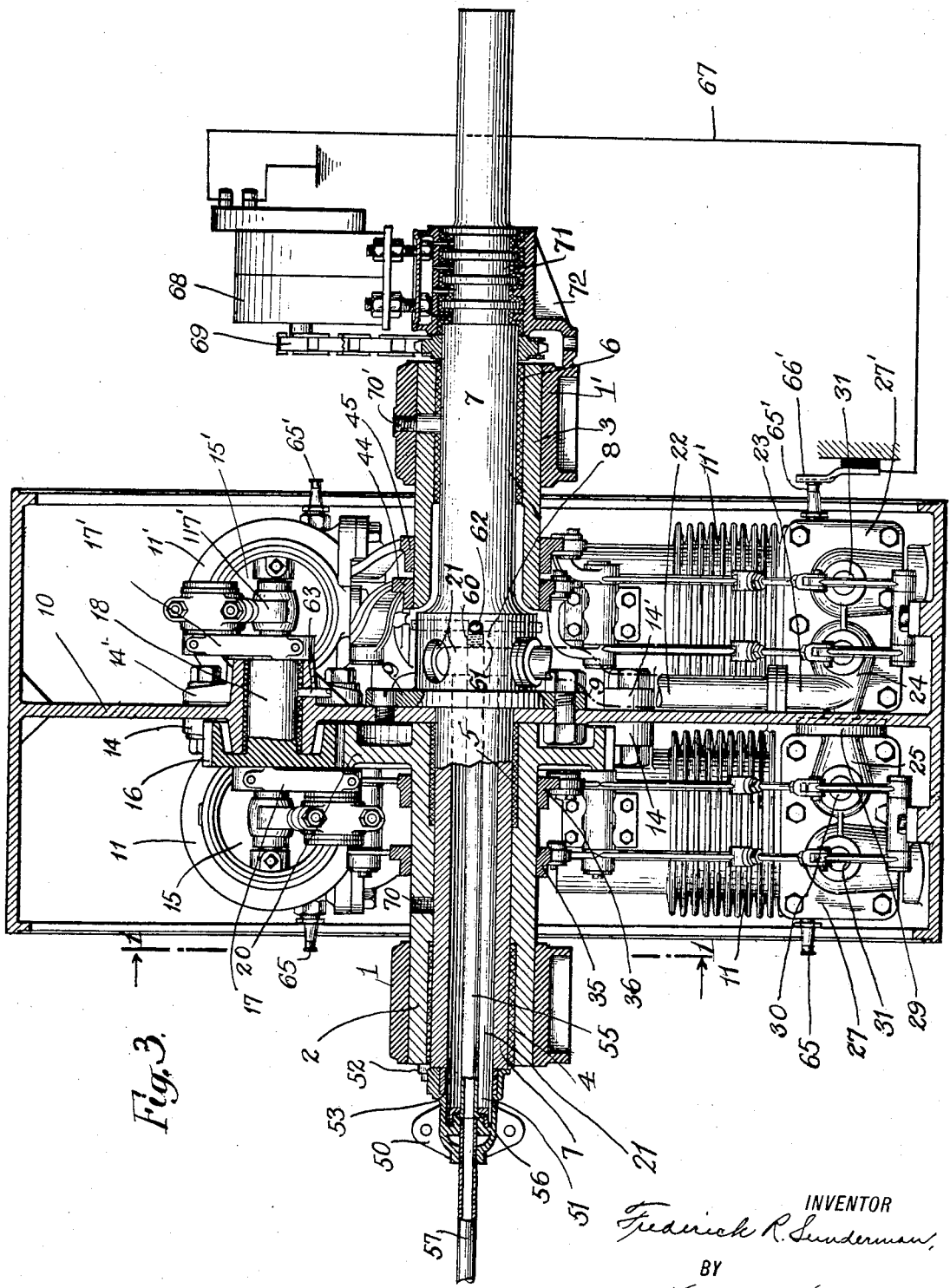
Fig. 3 is a sectional elevation taken on line 3—3 of Fig. 1.

Referring to the drawings, Figs. 1 and 3, 1, 1' are vertical projections or pillow-blocks of a suitable engine base, not shown, and they have openings respectively for receiving stationary sleeves or shafts 2 and 3, which are firmly secured from rotation in said pillow-blocks. These sleeves 2 and 3 are arranged in axial alinement and are provided with suitable bearing surfaces 4, 5 and 6 for a rotatable shaft 7 extending through these sleeves, and having at its central portion a cored-out enlargement 8 with an adjacent annular flange 9 to which is rigidly secured a frame 10, which, in the present form of the invention, is in the form of an annular disk or partition supporting on one side a plurality of cylinders 11, and supporting on the opposite side a plurality of cylinders 11', the cylinders being secured to the disk in a manner hereinafter to be described. The disk at its periphery is provided with a lateral flange or band 13. The flange 9 and disk 10, which are carried on and rotate with the shaft 7, constitute a rotatable supporting frame for the cylinders.

Referring to Figs. 1 and 3, there are, in the present form of the invention, four cylinders 11, provided with brackets 14, and four cylinders 11' provided with brackets 14' by which the cylinders are bolted to the vertical frame. The cylinders are thus arranged in pairs, the cylinders of each pair being lined up one abreast of the other, so that there is a common axial plane for the cylinders of each pair. The cylinders are provided with pistons 15, 15', the pistons of each pair of cylinders being provided with connecting rods 117 and 117', which are connected to pinions 16, there being four pinions in all, each being journaled in the vertical frame 10, and preferably spaced at equal angles concentrically about the axis of rotation, one pinion for each pair of cylinders. The connecting rods of each pair of cylinders are connected to the adjacent pinion by means of cranks 17, 17', these cranks being so arranged that when one piston of a pair is on its outer stroke the other piston is on its inner stroke, and in the present form of the invention these cranks are arranged 180° apart about the stub shaft 18 of their pinion, so that in a four-cycle engine the two pistons of any pair of cylinders are out of synchronism of movement one with respect to the other, by one stroke or a quarter of the complete cycle.

Each pinion 16 is geared to, and preferably directly in mesh with, a central pinion 20 rigidly secured to the inner end of the stationary sleeve or hollow shaft 2. With this construction, as the cylinders are fired to reciprocate the pistons, they in turn rotate the pinions, thereby driving them around the periphery of the stationary gear 20 and causing the frame carrying these pinions and its shaft 7 to rotate. Since each piston will make a complete reciprocation for every complete rotation of its pinion about its stub shaft 18, the number of reciprocations of the pistons per revolution of the frame 10 will depend upon the gear ratio between the pinions 16 and the stationary gear 20; and if the number of teeth of the pinions is equal to half the number of teeth of the stationary gear, it follows that the pinions will make two complete revolutions for each revolution of the frame or each time they rotate completely around the stationary gear, and hence each of the pistons will, for each rotation of the frame, make two complete reciprocations, or four cycles. I have arranged the pinions and gear with this ratio (the cam being stationary) and have provided suitable valve-controlling mechanism, hereinafter described, so as to obtain a four-cycle engine with each cylinder firing once for every revolution of the engine. If the ratio of the gearing between the pinions and the stationary gear were one to four instead of one to two, then each piston would make four complete reciprocations or two four-cycle movements and the cylinder would then be fired twice for each revolution of the engine, etc. And obviously if the cam shaft were made rotatable but at a different speed from the engine frame, these gear ratios would be varied.

Hydrocarbon fuel is led to the cylinders through an axial passage 21 formed in the rotary shaft 7 and extending from the left-hand end thereof to the enlargement of the shaft 8, at which point the passage is provided with four branches connecting with four pipes 22 leading to the manifolds 23 each of which has two branches 24, 25, one leading to each of a pair of cylinders. The manifolds 23 and the branches 24 are formed integrally with the valve chests 26 of one set of cylinders, for example, the cylinders 11', these valve chests being provided with flanges 27' by which they are bolted to the rear ends of the cylinders. The other branches 25 from the manifolds 23 are formed integrally with the valve chests 28 of the other set of cylinders 11, these last valve chests being secured to the cylinders 11 in a manner similar to that in which the valve chests 26 are secured to their cylinders; and the two branches 24 and 25 of the manifolds are provided with flanges 29 for securing them together. By means of this construction, each cylinder has detachably secured thereto its own valve chest separate and independent from every other cylinder, so that any valve chest may be removed for fixing or adjusting the valves without having to remove the cylinder, or for repairing or altering the adjustment of the valves of any other cylinder. The valve chests are provided with intake puppet valves 30 and with exhaust puppet valves 31 (Fig. 1), these valves being held seated by springs 32. Each valve chest has an exhaust outlet 33 in communication with the exhaust opening 34 in the peripheral shell of the engine.

Figure 2:
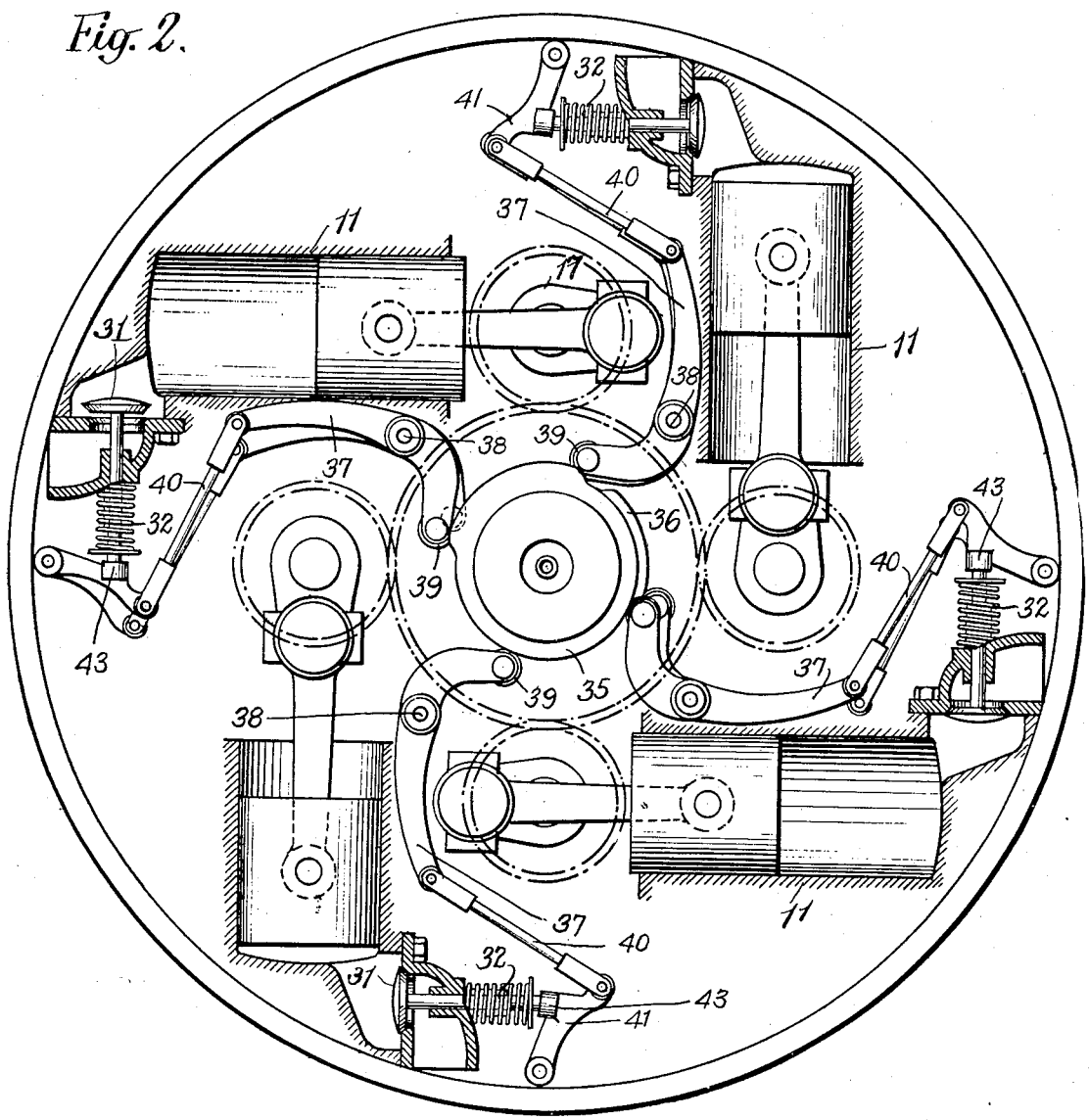
Fig. 2 is a similar view showing the valves and valve-operating mechanism of that end of the engine with the other parts shown somewhat diagrammatically or in outline.

I will now describe the means for controlling and operating the inlet and exhaust valves, and for this purpose I will describe the construction and operation of the valve-operating mechanism of the left-hand side of the engine, as shown in Fig. 3, and more detailed in Figs. 1 and 2.

The stationary hollow shaft or sleeve 2 is provided with two stationary cams 35, 36, the outer cam 35 being that controlling the exhaust valves, and the inner cam 36 being that controlling the intake valves of the cylinders 11. The mechanism operated by these cams for controlling the exhaust and inlet valves is exactly the same, so I will only describe that operating the exhaust valves more particularly shown in Figs. 1 and 2. This mechanism consists of a lever 37 pivoted on the vertical frame at 38 and carrying a cam roller 39 at one end engaging the cam 35, and at its other end being pivoted to a link 40 the other end of which is in turn pivoted to a lever 41, this lever in turn being pivoted to a bracket 42 which in turn is bolted to the peripheral flange of the engine. The lever 41 is provided with a cup or recessed portion 43 in which the end of the valve spindle engages; so that when the raised portion of the cam 35 engages roller 39, it rocks lever 37 on its pivot so as to lift lever 41 against the action of the spring 32 to open the exhaust valve which is again closed by the spring when the raised portion of the cam leaves the roller. The operation of the intake valves of the set of cylinders 11 by cam 36 is similar to that just described, and likewise the intake and exhaust valves of the set of cylinders 11' are operated and controlled in a similar manner by cams 44, 45 (Fig. 3). It will again be observed that either the cams or the cam-operated levers may be removed or adjusted without removing the valve chest or affecting the setting of the valves.

Fuel mixture is supplied to the axial passage 21 by any suitable carbureter, not shown, which may be secured to flanges 50 (Fig. 3) of an intake manifold 51 provided with a second flange 52 bolted to the outer end of the stationary sleeve 2. Adjacent the end of the rotary shaft 7 the manifold 51 is provided with an annular recess for receiving an expansion packing ring 53, making a tight running or rotating joint with the end of shaft 7 to prevent leakage of the fuel mixture at that point.

Lubricating oil is fed to the engine by means of a pipe 55 (Fig. 3) extending through the left-hand half of the hollow shaft 7 and adapted to rotate therewith, the outer end of the pipe extending rotatably into a coupling 56 in the manifold 51, where it forms a running joint with the coupling 56 into which a stationary oil pipe 57 projects. The inner end of pipe 55 extends to the enlarged hollowed portion 8 of the shaft 7 where it is threaded at 60 into the reduced end 61 of the axial bore of the shaft, from which radiate four openings 62 connected by suitable pipes, not shown, to the pinion bearings at 63 and to the cylinders at 64, 64'.

With the engine arranged and constructed as shown in the drawings (Figs. 1 to 3), the cylinder at the upper left-hand side of Fig. 1 is shown in the position ready to be fired, whereas the upper right-hand cylinder has completed its firing stroke and is in the position to commence the stroke for exhausting the gases, while the lower right-hand cylinder has completed its exhaust stroke and is in position to commence its fuel-suction stroke, whereas the fourth cylinder has completed its fuel-suction stroke and is in position to commence its compression stroke; so that it will be in position to be fired by the time it reaches the position of the upper left-hand cylinder. It will thus be seen that each cylinder makes its complete four-stroke cycle for each rotation of the engine and can be fired once for each revolution of the engine, by means hereinafter to be described. It will further be observed (referring to Fig. 3) that since the cranks of the two pistons of each pair are arranged 180 degrees apart the cylinder 11' immediately behind the upper left-hand cylinder 11 must be either at the beginning of its exhaust or compression stroke, and in the arrangement shown, it is at the beginning of its compression stroke, and hence the next succeeding cylinder—that is, the one immediately behind the upper right-hand cylinder 11, will be in position and in condition to be fired. It will thus be seen that only one cylinder of each pair is fired at any one instant, and that cylinders are simultaneously fired at two different points about the axis of rotation during each revolution, these two firing points, in the present embodiment of the invention, being at an angle of 90 degrees apart. This greatly facilitates the balance and smoothness of operation of the engine. It will further be noted that since one piston of each pair of cylinders is at its upper stroke while the other piston is at its inner stroke, the pistons of a pair counterbalance each other in operation and also avoid unbalancing of the engine from one moment to another by the action of centrifugal force on the cylinders, as would be the case if they moved simultaneously from an outer to an inner position on the frame during rotations thereof. This is a very important point in the operation of rotary engines.

It will also be noticed that the cylinders are not arranged radially with respect to the axis of rotation, but at an angle thereto, thus avoiding the direct action of centrifugal force parallel to the pistons.

To ignite the explosive mixture or fire the set of cylinders 11', I preferably provide the spark plugs of each cylinder with a projecting contact 65' (Fig. 3), and in the path of their rotation I provide a stationary contact 66' connected through any suitable electric circuit 67 to a suitable source of current, such as a high tension magneto, 68 driven by chain 69 from the rotary shaft 7. The cylinders of set 11 are similarly provided with a set of contacts 65 adapted to engage a stationary contact 66 (not shown) which is also connected to a branch from the circuit 67. I have shown this particular form of ignition system in the present form of the invention, since it is permissible where the cylinders of each set fire at exactly the same point during every rotation; but it will be understood that with modifications of the invention, or with the present form if desired, the ignition circuits may be provided with a timer, and led from suitable collector rings on the shaft through an axial bore to the cylinders, in a manner well understood in running electric wires from collector rings in electrical machinery axially through shafts to rotating coils.

The revolving shaft 7 is oiled through suitable openings 70, 70' drilled through the sleeves 2 and 3, and the right-hand end of the shaft is provided with a suitable thrust bearing 71 formed in a bracket 72 extending from the pillow-block 1', to which bracket is also secured the magneto 68 above mentioned.

It will be understood from the foregoing description that at the instant that the engine assumes the position shown in Figs. 1 to 3, the spark plug contact of the upper left-hand cylinder of Fig. 1 engages the stationary contact 66 (not shown) to ignite the explosive mixture in that cylinder, which moves the piston forward to rotate its pinion, the pinion making half a revolution by the time the cylinder reaches the position of the upper right-hand cylinder of Fig. 1, at which instant the piston has reached the outer extremity of its explosion stroke, and from this point the piston commences its inner or exhaust stroke which is completed by the time the cylinder reaches the position of the lower right-hand cylinder of Fig. 1, the exhaust and admission valves in the meantime having been properly operated by the cams 35 and 36 to permit the proper intake and exhaust of the gases. From this point to the position of the cylinder shown at the lower left-hand corner of Fig. 1, the piston moves forward on its suction stroke, drawing in fuel as cam 36 lifts its intake valve. From the position of the cylinder at the lower left-hand corner to that of the upper left-hand corner, the piston moves inward on its compression stroke, which is completed by the time the cylinder reaches said last position, thus completing its cycle. It will thus be seen that each cylinder of the set 11 reaches exactly the same position with respect to a point in space, namely, the stationary contact 66, at the moment it is ready to be fired.

It will be seen from this that the cylinders of each set are arranged in quadrature with respect to their cycle; that is, they are spaced apart a fourth of the distance they move through to complete their cycle. It will also be understood from the foregoing description that the cylinders of set 11′ operate in exactly the same manner, except that they are advanced 90° in spaced relation to cylinders 11; that is at the moment upper left-hand cylinder 11 is fired, the cylinder 11′ immediately behind the upper right-hand cylinder 11 is also fired, since this cylinder 11′ has completed its compression stroke and has just engaged its stationary contact 66′ to ignite or fire the mixture. Each of the eight cylinders, therefore, is fired during every revolution of the engine and no two of a pair or group connected to one pinion are fired or exert their thrust simultaneously. The arrangement is such that the engine is well balanced as regards weight and operation so as to prevent pulsations and vibrations in operation. The form of the invention just described is especially useful for aeroplanes where a light open engine is desired.

In Figs. 4 and 5 I have shown a modification of the engine useful for vehicles, the only substantial difference between it and the form just described being the provision of a casing in this modification, inclosing the pinions and gearing, and the exhaust manifold into which the cylinders exhaust.

Referring to Fig. 4 and comparing the same with Fig. 3, it will be observed that, instead of having a single central vertical disk 10 to which the cylinders are secured, this has been replaced by two parallel disks 75, 76 forming, with the central part of the peripheral flange 77 and the axial stationary sleeve 2′, an oil-containing casing inclosing the pinions 16′ and the central gear 20′. The vertical disk 76 is secured to the flange 9′ of the rotary shaft 7′ in the same manner as was done in the first form of the invention described, while the central portion of disk 75 is provided with a suitable bearing surrounding the stationary sleeve 2′ and containing packing 78 to prevent the leakage of oil from the casing through said bearing. This form of the invention is provided with cams 35′, 36′, as in the first form described, and with cam-operated valve levers, all as heretofore described. The hollow rotary shaft 7′ connects with pipes 22′ to convey hydrocarbon fuel to the cylinders, likewise in the manner heretofore described; but instead of the exhaust passage of the valve chest exhausting into the air as in the form first described, the peripheral flange or band 77 is fitted with a stationary semi-circular manifold 80 having flanges 81 forming a running joint with the outer surface of the band 77, and the gases are discharged into this manifold which extends through an arc sufficient to include the points at which the two sets of cylinders exhaust. Any suitable exhaust pipe and muffler, such as shown at 82 and 83, may be connected to this manifold.

Hydrocarbon mixture is led to the cylinders axially through hollow shaft 7′ having four branch outlets 85 drilled radially in the shaft and connected to the cylinders by suitable pipes 22′, as heretofore described in connection with the first form of the invention. The cylinders in this form of the invention may be preferably water-cooled, and in that event water is also led to the cylinders axially through the hollow shaft 7′ by means of a pipe 86 extending from the left-hand end of the engine as shown in Fig. 4, centrally through the hollow shaft 7′ beyond the branch openings 85 for the hydrocarbon fuel to a reduced boring into which the pipe is threaded, this boring having branches 87 to which pipes, not shown, are connected leading to the different cylinders for supplying the water thereto. The water may be returned in a similar manner through the right-hand end of the shaft (not shown, as the manner of accomplishing the same will be understood from the inlet supply).

The oil supply for the cylinders is led through pipe 88 passing axially from the left-hand end of the engine through the water-conveying pipe 86, the pipe 88 extending past the radial branch openings 87 for the water supply, and being threaded into a reduced boring to the right thereof, having four radial branches 89 with which pipes (not shown) may connect for leading oil to the cylinders and crank bearings, as described in connection with the first form of the invention.

The outer ends of the different pipes 86 and 88 may be arranged rotatably with respect to the stationary connecting pipes in the same general manner as shown at the left-hand side of Fig. 3 in connection with the pipe 55, and these connections are therefore omitted from Fig. 4.

It will be noted that the operation of this form of the invention is substantially like that shown in Figs. 1 to 3, heretofore described, and that as regards the arrangement and construction, the only material differences between the two are, modifications permitting the inclosure of the stationary gear and pinions in the oil-filled compartment, the provision of a suitable exhaust manifold for the cylinders, the feature of water-cooling the cylinders, and the necessary relative readjustment of certain parts to take care of these differences in construction.

In Figs. 6 and 7 I have shown a third modification of the invention in which, instead of inclosing the pinion and gears in an oil-filled casing, I have provided a casing inclosing not only the gear and pinions, but also the crank and pinion bearings, together with the inner ends of the cylinders; and within this casing atomized oil is injected to keep all of the parts lubricated, as hereinafter explained.

Referring to this modification, 90, 90' are suitable pillow-blocks or vertical supports to which are rigidly secured stationary sleeves 91, 92. The sleeve 91 carries at its inner end a stationary pinion 20'', while the sleeve 92 extends within the casing beyond the axial plane of the left-hand set of cylinders 11. This stationary sleeve 92, in this modification of the invention, carries both the cams 35'', 36'' for the left-hand set of cylinders, and the cams 44'', 45'' for the right-hand set of cylinders. The sets of cylinders 11 and 11' are secured to the sides of a rectangular casing 93 which has a right-hand end wall 99 and a left-hand end wall 100. The end walls are provided with openings 120 in which there are formed halves of bearings 121 for the ends of the crank shafts. The caps 122 are positioned in these openings and form the other halves of the bearings which accommodate the crank shafts. The right-hand end wall 99 has an opening through which passes the stationary sleeve 92, and a bearing sleeve 123 formed on the end wall 99 accommodates a bearing collar 124 formed on the sleeve 92. The bearing sleeve 123 is made large enough to permit the cam rings 35'', 36'', 44'' and 45'' to pass through so that these rings will be placed upon the sleeve 92 before it is positioned within the casing 93. The left-hand end wall 100 is bolted to the flange 9'' on the rotary shaft 7''. The casing 95 is secured to the end wall 99 to cover the openings therein. The pinions 16'' in this modification are secured to the left-hand ends 18'' of the crank shafts which are journaled in the bearings in the end walls. These pinions mesh with the gear 20'' on the stationary shaft 91. The sets of pistons 15, 15' are connected to their cranks 101, 102 for driving the crank shafts which are journaled in the bearings in the end walls. A casing 94 is secured to the end wall 100 and covers pinions 16'' and 20'', as well as the openings 120 in the end wall 100. It has a bearing sleeve 96 which accommodates sleeve 91.

It will be seen that the casing 93 forms a rigid frame which carries the cylinders 11, 11', as well as all of the bearings of the crank shafts.

It will thus be seen from this description that as the cylinders are fired in the manner heretofore described in connection with the first form of the invention, the pinions are rotated around the stationary gear 20'', thus causing the casing 93 and the shaft 7'' to rotate.

Hydrocarbon fuel is conveyed to the cylinders axially through shaft 7'' with its radial branch openings and pipes 105, as and in the manner heretofore described in connection with the first form of the invention, while the apparatus for oiling the cylinders, the crank bearings and all of the other parts inclosed in the casing 93, consists of an oil supply pipe led axially through the hollow shaft 7'' and threaded into a restricted portion of the axial bore 106 from which there are radial outlets to the casing, and these are supplied with suitable atomizing nozzles 107 for spraying atomized lubricant into the casing. These may be provided directly with the atomizing nozzles as shown, or pipes (not shown) may be provided leading therefrom into any part of the casing for discharging the oil at any part of the casing. Any suitable means may be provided for furnishing oil in the oil feed pipes under pressure to cause it to be discharged through the nozzles in atomized form.

The valves controlling the admission and exhaust of hydrocarbon fuel to the cylinders, in this form of the invention, are arranged in valve chests 108. The valves are of the usual puppet valve type, and are operated from the cams by reciprocating rods or spindles 110 slidingly extending through openings in the casing and carrying cam-engaging rollers 111 at their inner ends, and at their outer ends being provided with arms 112 for engaging and operating the valve stems 113.

The ignition system for this form of the invention is not shown, inasmuch as it will be identical to that shown in connection with the first form of the invention, the magneto being driven in the same manner as heretofore explained, from the sprocket 115.

While I have described my invention as embodied in what I now believe to be its preferred forms, it will be obvious to those skilled in the art, after having understood my invention, that various changes and modifications may be made therein without departing from the spirit or scope of the invention, and I do not wish to be understood as limiting myself other than as indicated in the appended claims.

Having thus described my invention, what I claim as new and desire to secure by Letters Patent, is:—

1. In a rotary internal combustion engine, the combination of a stationary gear, a rotary drive shaft extending axially through said gear, means mounted on said shaft to rotate therewith, a plurality of pinions journaled on said means and geared to the stationary gear, a plurality of cylinders mounted concentrically of said shaft to rotate together with said means about the axis thereof, there being a group of cylinders for each pinion, pistons in said cylinders, means connecting the pistons of each group of cylinders with one of said pinions for rotating the same to drive the cylinders and shaft rotatably, said connections between the pinions and their driving pistons being such that no two cylinders of a group fire simultaneously, means for conveying fuel mixture to the rotary cylinders, valves controlling the intake and exhaust of the cylinders, and cams operatively related to said valves for controlling the same.

2. In a rotary internal combustion engine, the combination of a stationary gear, a rotary drive shaft concentric with said gear, a frame mounted on said shaft to rotate therewith, a plurality of pinions journaled on said frame and geared to the stationary gear, a plurality of cylinders mounted on said frame concentrically of said shaft to rotate together with the frame about the axis of the shaft, there being a group of cylinders for each pinion, pistons in said cylinders, means connecting the pistons of each group of cylinders to one of said pinions to rotate the pinions for driving the frame and shaft rotatably, said connections between the pinions and their driving pistons being such that no two cylinders of a group exert their thrust synchronously, and means for conveying and controlling fuel mixture to the cylinders.

3. In a rotary internal combustion engine, the combination of a stationary gear, a rotary drive shaft mounted concentric with the gear and having an enlarged portion, said shaft having an axial passage extending to said portion and having one or more openings thereto at said enlarged portion, a frame rigidly secured to said shaft at said enlarged portion to rotate with the shaft, a plurality of pinions journaled on said frame and geared to said stationary gear, a plurality of cylinders rigidly mounted on said frame to rotate therewith, there being a group of cylinders for each pinion, a piston in each cylinder and means operatively connecting the pistons of each group of cylinders to one of the pinions to rotate the pinions and thereby rotate the shaft and frame, said connections between the pinions and their driving pistons being such that no two cylinders of a group fire simultaneously, means having passages communicating with the openings in the enlarged portion of said shaft and with the cylinders for conveying hydrocarbon fuel from said enlarged portion of the shaft to the cylinders, and means for controlling the fuel mixture supplied to the cylinders.

4. In a rotary internal combustion engine, the combination of a stationary member having a stationary gear secured thereto, a rotary drive shaft concentric with said stationary member and journaled at one end therein, said shaft having an enlarged portion, means secured to said enlarged portion to rotate therewith, a plurality of pinions journaled on said last means and geared to said stationary gear, a plurality of cylinders mounted concentrically of said gear to rotate together with said means about the axis thereof, there being a group of cylinders for each pinion, pistons in said cylinders, means connecting the pistons of each group of cylinders to one of said pinions to rotate the pinions for driving the cylinders and shaft rotatably, said connections between the pinions and their driving pistons being such that no two cylinders of a group fire simultaneously, and means for conveying and controlling fuel mixture to the cylinders.

5. In a four-cycle rotary internal combustion engine, the combination of a stationary gear, a rotary drive shaft concentric to said gear, a frame secured to said drive shaft to rotate therewith, a plurality of pinions journaled on said frame and geared to said gear, a crank shaft for each of said pinions arranged longitudinally of said drive shaft, a plurality of cylinders mounted on said frame concentric about the axis thereof, there being a group of cylinders for each pinion, pistons in said cylinders, means connecting the pistons of each group of cylinders to one of said crank shafts to rotate the pinions for driving the shaft rotatably, said piston connection for each group of cylinders being such that the cylinders of a group do not exert their thrust synchronously, and means for conveying and controlling fuel mixture to the cylinders.

6. In a four-cycle rotary internal combustion engine, the combination of a stationary gear, a rotary shaft concentric with the gear, means secured to said shaft to rotate therewith, a plurality of pinions journaled on said means and spaced substantially uniformly about the axis of said shaft and geared to the stationary gear, a plurality of cylinders secured to said means and mounted concentrically of the axis of said shaft to rotate with said means about said axis, there being a group of cylinders for each pinion, pistons in said cylinders, means connecting the pistons of each group of cylinders to one of said pinions to rotate the pinions for driving the cylinders and shaft rotatably, said connections between a pinion and its group of pistons being such that no two cylinders of a group exert their thrust synchronously, and means for conveying and controlling fuel mixture to the cylinders.

7. In a four-cycle rotary internal combustion engine, the combination of a stationary member, a frame rotatable about the axis of said member, a plurality of groups of cylinders mounted on said frame concentrically about the axis of the stationary member to rotate with the frame, a cylinder of each group being located in a vertical plane transverse to the axis of said stationary member and another cylinder of each group being located in a second vertical plane parallel with the first, a piston in each cylinder, means operatively connecting the pistons of each group of cylinders one to another so that no two cylinders of a group exert their thrust synchronously, means gearing each group of pistons with said stationary member to cause the frame to be driven rotatably about the axis of said stationary member by the movement of the pistons, and means for conveying and controlling fuel to the cylinders for operating the pistons.

8. In a four-cycle rotary internal combustion engine, the combination of stationary sleeves at each end of the engine, means for supporting said sleeves, a stationary gear on one of said sleeves, a rotary drive shaft journaled in said sleeves, a frame secured at one end to said shaft to rotate therewith and being journaled at its other end on one of said sleeves, said frame having bearings therein for crank shafts, a plurality of crank shafts journaled in said crank shaft bearings, a pinion for each crank shaft geared to said stationary gear, a plurality of cylinders mounted on said frame concentric about the axis thereof, there being a group of cylinders for each pinion, pistons in said cylinders, means connecting the pistons of each group of cylinders to one of said pinions to rotate the pinions for driving the frame and shaft, the connection between any pinion and its driving pistons being such that its pistons do not exert their thrust synchronously, and means for conveying and controlling fuel to the cylinders.

9. In a four-cycle rotary internal combustion engine, the combination of a stationary sleeve having a stationary gear secured thereto, a rotary drive shaft journaled at one end in said sleeve, a second stationary sleeve at the other end of the engine in which the other end of the shaft is journaled, a frame rigidly secured to said shaft to rotate therewith and having a journal around one of said sleeves, four crank shafts journaled in said frame, pinions mounted on said crank shafts and geared to said stationary gear, a plurality of cylinders rigidly secured to said frame concentric about the axis of the shaft, there being a pair of cylinders for each pinion, pistons in said cylinders, and means connecting the two pistons of each pair of cylinders to one of said crank shafts to rotate the pinions for rotating the frame and shaft, the connection between any pinion and its driving pistons being such that its pistons do not exert their thrust synchronously, and means for conveying and controlling fuel mixture to the cylinders.

10. In a four-cycle rotary internal combustion engine, the combination of a stationary sleeve having a stationary gear secured thereto, a rotary drive shaft journaled at one end in said sleeve, a second stationary sleeve at the other end of the engine in which the other end of the shaft is journaled, a flange on the shaft, means secured to said flange to rotate with the shaft, four crank shafts journaled at one end in said last means, means journaled on the second stationary sleeve, in which means the adjacent ends of the crank shafts are journaled, pinions mounted on said crank shafts and geared to said stationary gear, a plurality of cylinders mounted concentrically to rotate together about the axis of the shaft, there being a pair of cylinders for each pinion, means connecting the cylinders to the shaft, pistons in said cylinders, and means connecting the two pistons of each pair of cylinders to one of said crank shafts to rotate the pinions for rotating the shaft, and means for conveying and controlling fuel mixture to the cylinders.

11. In a four-cycle rotary internal combustion engine, the combination of a rotary drive shaft, a stationary sleeve at each end of the engine in which said shaft is journaled, at least one of said sleeves extending inwardly of the engine a considerable length along said shaft, means for supporting said sleeves, a stationary gear secured to one of said sleeves, a frame secured to said shaft to rotate therewith and journaled on one of said sleeves, a plurality of pinions journaled on said frame and geared to said stationary gear, a plurality of cylinders mounted on said frame, there being at least a pair of cylinders for each pinion, pistons in said cylinders, means connecting the pistons of each pair of cylinders to one of said pinions to rotate the pinions for rotating the shaft and frame, and means for conveying and controlling fuel mixture to the cylinders.

12. In a four-cycle rotary internal combustion engine, the combination of a rotary drive shaft, a stationary sleeve at each end of the engine in which said shaft is journaled, at least one of said sleeves extending inwardly of the engine a considerable length along said shaft, valve-controlling cam members mounted on said last sleeve, means for supporting said sleeves, a stationary gear secured to one of said sleeves, a frame secured to said shaft to rotate therewith and journaled at its other end on one of said sleeves, a plurality of pinions journaled on said frame and geared to said stationary gear, a plurality of cylinders mounted on said frame concentric about the axis thereof, there being at least a pair of cylinders for each pinion, pistons in said cylinders, means including cranks and crank shafts for connecting the pistons of each pair of cylinders to one of said pinions to rotate the pinions for rotating the shaft and frame, and valve-controlling mechanism operatively engaging said cam devices on the sleeve.

13. In a four-cycle rotary internal combustion engine, the combination of a stationary gear, a rotary shaft concentric with the gear, means secured to said shaft to rotate therewith, a plurality of pinions journaled on said means and spaced at substantially equal angles about said axis and geared to the stationary gear, a plurality of cylinders mounted concentrically of said axis to rotate together with said means about said axis, there being a pair of cylinders for each pinion, pistons in said cylinders, means connecting the two pistons of each pair of cylinders to one of said pinions to rotate the pinions for driving the shaft and cylinders rotatably about said axis, said connection between a pinion and its two pistons being such that when one of said pistons is on its inner stroke the other is on its outer stroke, and means for conveying and controlling fuel mixture to the cylinders.

14. In a four-cycle rotary internal combustion engine, the combination of a stationary gear, a rotary shaft concentric with the gear, means secured to said shaft to rotate therewith, a plurality of pinions journaled in said means and spaced at substantially equal angles about said axis and geared to the stationary gear, four pairs of cylinders mounted concentrically of said axis to rotate together with said means about said axis, pistons in said cylinders, each pair of pistons being connected to one of the pinions to rotate the same for driving the shaft and cylinders rotatably about said axis, two cranks for each pair of pistons arranged 180° apart for connecting the same to their pinion, and means for conveying and controlling fuel to the cylinders.

15. In a four-cycle rotary internal combustion engine, the combination of a stationary gear, a frame rotatable about an axis concentric with the gear, a plurality of pinions journaled on said frame and spaced at substantially equal angles about said axis and geared to the stationary gear, a plurality of pairs of cylinders mounted on said frame concentric about the axis to rotate with the frame, a cylinder of each pair being located in a vertical plane transverse of the said axis, and the other cylinder of each pair being located in a vertical plane parallel to said first plane, pistons in said cylinders, means connecting each pair of pistons with one of said pinions to drive the frame rotatably about said axis, said means causing one of said pistons to be at one extremity of its stroke when the other piston is at the opposite extremity of its stroke, and means for conveying and controlling fuel to the cylinders for operating the pistons.

16. In a four-cycle rotary internal combustion engine, the combination of a stationary member, a frame rotatable about the axis of the same, a plurality of pairs of cylinders mounted on said frame concentrically about the stationary member to rotate with the frame, a cylinder of each pair being located in a vertical plane transverse to the axis of said stationary member, and the other cylinder of each pair being located in a second vertical plane parallel with the first, a piston in each cylinder, means operatively connecting the two pistons of each pair one to the other to cause one to move on its outer stroke while the other is on its inner stroke, means gearing each pair of pistons with said stationary member to cause the frame to be driven rotatably about the axis of said member by the movement of the pistons, and means for conveying and controlling fuel to the cylinders for operating the pistons.

17. In a four-cycle rotary internal combustion engine, the combination of a stationary member, a frame rotatable about the axis of the same, a plurality of pairs of cylinders mounted on said frame concentrically about the member to rotate with the frame, a cylinder of each pair being located in a vertical plane transverse to the axis of said stationary member, and the other cylinder of each pair being located in a second vertical plane parallel with the first, a piston in each cylinder, means operatively connecting the two pistons of each pair one to the other to cause one to move on its outer stroke while the other is on its inner stroke, means gearing each pair of pistons with said stationary member to cause the frame to be driven rotatably about the same by the movements of the pistons, means for conveying fuel to the cylinders, valves controlling the admission of fuel to the cylinders, and means including ignition devices for the cylinders for causing the mixture in one cylinder each of different pairs to be exploded simultaneously.

In testimony whereof, I have signed my name to this specification.

FREDERICK R. SUNDERMAN.